United States Patent [19]
Yoshida

[11] 3,928,576
[45] Dec. 23, 1975

[54] METHOD OF PREVENTION AND TREATMENT FOR THE KETOSIS AND OSTEOMALACIA OF CATTLE

[76] Inventor: Shigeru Yoshida, 464 Kami Iwanari, Miyuki-cho, Fukuyama, Hiroshima, Japan

[22] Filed: June 5, 1973

[21] Appl. No.: 367,162

[30] Foreign Application Priority Data
June 6, 1972   Japan.................................. 47-55579

[52] U.S. Cl................................. 424/154; 424/156
[51] Int. Cl.². .................. A61K 33/06; A61K 33/14
[58] Field of Search............................ 424/154, 156

[56] References Cited
OTHER PUBLICATIONS
Ender et al., Veterinary Bulletin, Vol. 21, (1951), P. 167, (Article 808).
Merck Index–Eighth Edition, 1968, pp. 635 and 636.
Polukhin et al., – Chem. Abst., Vol. 63 (1965), p. 8797C.
Jones–Veterinary Pharmacology and Therapeutics–3rd Edit. (1965), p. 99.
Ender et al., Acta Agricultural Sulcana, Vol. 3, 1949, p. 113.

*Primary Examiner*—Sam Rosen
*Attorney, Agent, or Firm*—Kemon, Palmer & Estabrook

[57] ABSTRACT

A method of prevention and treatment for the ketosis and osteomalacia of cattle which consists in administering salts of magnesium.

3 Claims, No Drawings

METHOD OF PREVENTION AND TREATMENT FOR THE KETOSIS AND OSTEOMALACIA OF CATTLE

This invention relates to a method of prevention and treatment for the ketosis and osteomalacia of cattle.

Ketosis is an acute disease often attacking cattle which obstructs the metabolism of carbohydrates and fats in the organism of cattle. As the result, a ketone body such as acetoacetate, $\beta$-hydroxybutyrate and acetone increases in the cattle blood, giving rise to the odor of acetone in the urine, milk and breath of cattle.

A cow affected by the ketosis presents major clinical symptoms such as anorexia or loss of appetite, rapid decrease of weight and a sharp drop in the yield of milk.

Osteomalacia is a chronic disease of cattle. A cow suffering from this disease indicates, for example, diarrhea, loose passage, extreme loss of weight, demineralization of bones, lameness, arthritis, and disorder of the kidney and liver. Such a cow yields abnormal milk such as the Utrecht abnormal milk which gives a positive result in the alcohol test or otherwise low fat milk. A young growing cow attacked by the osteomalacia presents a low rate of weight increase and an insufficient development of bones and teeth.

To date, however, the origin and mechanism of the ketosis and osteomalacia have been unknown and any reliable method of treatment has not been established for these diseases. The nutritional disorder of cattle affected thereby causes tremendous damage to the dairy farming industry. The conventional attempt to cure the ketosis was to administer sugars, for example, grape sugar or vitamin B complex. On the other hand, the prior art remedial measure for the osteomalacia was to apply a calcium-containing substance or a mixture of vitamins A and D. However, neither process proved unfailingly effective.

The present inventor has found that a large number of cows already affected by osteomalacia are also suffering from ketosis and that the occurrence of both diseases leads to a low concentration of magnesium ion in the serum obtained from such cows. It has also been disclosed that in the case of ketosis, magnesium (Mg) has a pathological action as a coenzyme for the metabolism of sugars and the ketone body, and in the case of osteomalacia, magnesium (Mg) pathologically acts as a trigger for the matabolism of calcium (Ca). Based on the above discoveries, the present inventor administered salts of magnesium to cattle attacked by the ketosis or osteomalacia, obtaining a prominent remedial effect. Accordingly, this invention provides a method of prevention and treatment for the ketosis and osteomalacia of cattle which consists in administering salts of magnesium to affected cattle.

While salts of magnesium themselves may orally be administered, it is preferred to prepare an injection containing the magnesium salts as an effective component, adding the salts to fodder or mix the salts with fodder additives such as bone black, calcium carbonate and sodium chloride. Further, the injection may contain grape sugar, vitamin B complex, vitamins A, D and E and minerals such as calcium.

The preferred administration per day of salts of magnesium to affected cattle in venous injection is chosen to be 1 to 4g as converted to Mg and 10 to 20g in oral application.

This invention will be more fully understood from the examples which follow.

EXAMPLE 1

An injection containing magnesium sulfate and grape sugar was administered to 20 milk cows suffering from ketosis. Full cure was realized in 4.4 days on the average, except for one of the cows. The procedure and results of treatment are given below.

| | |
|---|---|
| Days required for cure: | 2 to 7 days (4.4 days on the average) |
| Amount of magnesium sulfate applied: | 8.9 g/day on the average |
| Amount of grape sugar applied: | 160 g/day on the average |
| Concentration of magnesium in the serum when initially attacked: | 1.33 to 2.2g meg/l (1.77 meg/l on the average) |
| Concentration of magnesium in the serum after cured: | 1.85 to 2.39 meg/l (2.08 meg/l on the average) |

| Examples of disease | Major simptom | Days required for cure | State of cure | Concentration of a ketone body in urine |
|---|---|---|---|---|
| 1 | Digestive type *1 | 4 | o | 0 (150) |
| 2 | " | 6 | o | 0 (100) |
| 3 | " | 4 | o | 0 (100) |
| 4 | " | 2 | o | 0 (100) |
| 5 | " | 6 | o | 0 (200) |
| 6 | " | 7 | o | 0 (70) |
| 7 | " | 3 | o | 5> (200) |
| 8 | " | 2 | o | 0 (100) |
| 9 | Digestive type | 2 | o | 0 (80) |
| 10 | " | 8 | x | 30 (200) |
| 11 | " | 5 | o | 0 (100) |
| 12 | " | 7 | o | 0 (200) |
| 13 | Neural type *2 | 5 | o | 0 (100) |
| 14 | Digestive system | 3 | o | 0 (100) |
| 15 | " | 5 | o | 0 (200) |
| 16 | " | 7 | o | 5> (50) |
| 17 | " | 7 | o | 0 (30) |
| 18 | " | 3 | o | 0 (100) |
| 19 | Neural type | 3 | o | 0 (50) |
| 20 | Digestive type | 3 | o | 5> (100) |

*1: failure to walk, coma, loss of appetite and rumination, stoppage of the peristalsis of the stomach and intestines, indigestion, loose passage, etc.
*2: Allotriophagic, neural disorder, etc.
( ): values measured when attacked
o: complete cure
x: incomplete cure

EXAMPLE 2

Treatment was attempted for three cases of digestive type ketosis occurring in Holstein milk cows. A solution of magnesium chloride (prepared by dissolving 9.5g of $MgCl_2$ in 100 ml of distilled water) was venously injected once a day. Acetone disappeared from the urine of said affected milch cows in 4 days in two of them and 5 days in the remainder, proving that the ketosis was cured. In this example, magnesium chloride was administered at the rate of 2.4g (equivalent to Mg) per day.

EXAMPLE 3

Treatment was carried out for 53 Holstein milk cows affected by osteomalacia by administering one year 10g of magnesium per day per head by adding the magnesium to fodder in the form of basic magnesium carbonate, the results being presented below. Cure of the osteomalacia was judged by measuring the values of serum alkaline phosphatase activity (abbreviated as "SAPA"). Normal or healthy cattle had a SAPA value of 3 to 7 K.A. units, whereas the attacked 53 cows showed a higher SAPA value than 7 K.A. units, averaging 8.57 K.A. units.

Table 1

|  | SAPA value | Concentration of Mg in serum |
|---|---|---|
| Before administration of Mg | 8.57 K.A.units | 1.75 meq/l |
| After administration of Mg | 6.49 K.A.units | 1.98 meq/l |

Note: The values of SAPA and those of the concentration of Mg in the serum given in Table 1 above were obtained by averaging through the 53 affected cows.

As apparent from Table 1, the SAPA value rising to 8.57 K.A. units due to the occurrence of osteomalacia decreased to a normal level of 6.49 K.A. units after full cure of the disease. The concentration of magnesium in the serum increased to a normal value of 1.98 meq/l from 1.75 meq/l before cure.

Table 2

|  | Milk test (using alcohol) | | | |
|---|---|---|---|---|
|  | − | ± | + | ++ | +++ |
| Before administration of Mg |  |  | 8 cows | 42 cows | 3 cows |
| After administration of Mg | 41 cows | 3 cows | 2 cows | 7 cows |  |

Table 2 above shows that before administration of magnesium, all the affected cows yielded milk unstable in alcohol (namely, indicating a positive value in the alcohol test). One year after administration of magnesium, however, 41 cows gave good milk stable in alcohol (namely, presenting a negative value in the alcohol test), showing that the cows were fully cured of the disease.

Table 3

|  | Yield of milk | Fat percentage | Yield of fat |
|---|---|---|---|
| One year before administration of Mg | 3792 kg | 3.28 % | 122 kg |
| One year after administration of Mg | 5224 kg | 3.42 % | 179 kg |

Note: The values presented in Table 3 above were obtained by averaging through 53 cows.

As seen from Table 3, cure of osteomalacia rendered the cows healthy, attaining the increased yield of milk and fat. Of the above-mentioned 53 cows already suffering from osteomalacia, 18 heads were concurrently attacked by ketosis for one year before administration of magnesium, but after said administration only one head still suffered from ketosis, though cured of osteomalacia. This fact is an evident proof that administration of magnesium is prominently effective for the prevention of ketosis.

What is claimed is:

1. A method for the prevention and treatment of ketosis and osteomalacia of cattle which consists in the administration to cattle by venous injection or oral administration of magnesium salt selected from the group consisting of magnesium sulfate, magnesium chloride and basic magnesium carbonate wherein said salt is administered in an amount corresponding to between about 1 to 4 g. of Mg per head of cattle when the administration is by venous injection and in an amount between about 10 to 20 g. of Mg per head of cattle when the administration is orally.

2. The method of claim 1 wherein grape sugar is administered simultaneously with said magnesium salt.

3. The method of claim 1 wherein said magnesium salt is orally administered by being mixed with fodder or fodder additives.

* * * * *